United States Patent
Gerber et al.

(10) Patent No.: US 7,969,914 B1
(45) Date of Patent: Jun. 28, 2011

(54) METHOD FOR ESTABLISHING AND OPERATING A MOBILE AD-HOC NETWORK

(75) Inventors: Matthew Gerber, Winter Springs, FL (US); Robert Hall, Berkeley Heights, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 368 days.

(21) Appl. No.: 12/220,598

(22) Filed: Jul. 25, 2008

(51) Int. Cl.
*H04L 12/28* (2006.01)
*G06F 15/177* (2006.01)

(52) U.S. Cl. ........ 370/256; 370/254; 370/255; 709/220; 709/221; 709/222

(58) Field of Classification Search .................. 370/254, 370/255, 256; 709/220, 221, 222
See application file for complete search history.

(56) References Cited

U.S. PATENT DOCUMENTS

| | | | |
|---|---|---|---|
| 2003/0235158 A1* | 12/2003 | Lee et al. | 370/256 |
| 2005/0254453 A1* | 11/2005 | Barneah | 370/328 |
| 2005/0259597 A1* | 11/2005 | Benedetto et al. | 370/254 |
| 2006/0023677 A1* | 2/2006 | Labrador et al. | 370/338 |
| 2006/0128349 A1* | 6/2006 | Yoon | 455/343.2 |
| 2007/0217346 A1* | 9/2007 | Zheng et al. | 370/255 |
| 2008/0080401 A1* | 4/2008 | Ribiere et al. | 370/256 |
| 2008/0159236 A1* | 7/2008 | Ch'ng et al. | 370/335 |
| 2008/0192737 A1* | 8/2008 | Miyazaki et al. | 370/360 |
| 2009/0041039 A1* | 2/2009 | Bear et al. | 370/401 |

* cited by examiner

*Primary Examiner* — Ayaz R Sheikh
*Assistant Examiner* — Tarell Hampton
(74) *Attorney, Agent, or Firm* — Woodcock Washburn LLP

(57) ABSTRACT

A method for creating an ad-hoc network that assembles a MANET inductively with no need for any node to request any information, needing only to hear information from an ad-hoc group of at least one node, to select its uplink relay node from the group. The resulting tree-structure network efficiently communicates information upstream to a root node and to all intermediate relay nodes. Downstream communication is enabled by having nodes remember node addresses of information packets arriving from respective downstream nodes.

21 Claims, 3 Drawing Sheets

METHOD FOR ESTABLISHING AND OPERATING A MOBILE AD-HOC NETWORK

BACKGROUND OF THE INVENTION

This pertains to networking and, in particular, to ad-hoc networking.

The primary issue with Mobile Ad-Hoc Networking (MANET) is that of organizing multiple wireless (generally RF) network nodes into a functional, connected network without the benefit of in-place infrastructure, such as fixed hubs that govern the network. Well-known MANET routing protocols include:

Ad-Hoc On-Demand Distance Vector (AODV),
Dynamic MANET On-Demand (DYMO),
Dynamic Source Routing (DSR),
Landmark Ad-Hoc Routing Protocol (LANMAR),
Optimized Link-State Routing (OLSR),
Topology Broadcast based on Reverse Path Forwarding (TBRPF),
Zone Routing Protocol (ZRP), and there are others. Generally speaking, existing MANET protocols work by either proactive or reactive topology dissemination. Under proactive MANET protocols either all nodes or a subset of all nodes periodically transmit into the network one of the following: (a) all routing information they know, (b) a subset of all routing information they know, or (c) the difference between their previous routing information and current routing information. Under reactive MANET protocols nodes that need a route send route-request packets into the MANET, and the protocol brokers the response to those requests.

In addition to the general class of the MANET problem, there is a subclass in which creating a fully functioning network among the nodes of the MANET is actually secondary to the need to efficiently and reliably direct traffic to and from a single node that is chosen as a destination point for significant amounts of information; for example, the Headquarters node in a military environment.

Any MANET protocol can address this subclass, but most do so very poorly when there are many nodes, and/or in the face of any significant mobility of the nodes.

SUMMARY OF THE INVENTION

An advance in the art is realized by creating an ad-hoc network with a protocol that assembles a MANET inductively with no need for any node to request any information, needing only to hear information from an ad-hoc group of at least one node, to select its uplink relay node from the group. The resulting tree-structure network efficiently communicates information upstream to a root node and to all intermediate relay nodes. Downstream communication is enabled by having nodes remember node addresses of information packets arriving from respective downstream nodes.

The ad-hoc network is created beginning with a root node, by each node selecting the most appropriate uplink relay node for itself from an ad-hoc group of nodes that broadcast a heartbeat message that are close enough for the node to hear, those being relay nodes. Each node also continually determines whether it should become a relay node when it is not; once a node becomes a relay node it also continually determines whether it should cease being a relay node. What results is a tree-structured network, with the root node being at the top; and the processes for becoming, and for ceasing to be, a relay node aim to make the network have as few tiers as practical, thereby enabling information packets to reach the root node using, on the average, fewer hops than otherwise.

Each node maintains information only about its uplink node and, if it is a relay, some information that it captures from nodes that are directly downstream from itself, such as source address contained in an information packet arriving from a downstream node and identity of the link through which the information packet arrived.

DETAILED DESCRIPTION

Figure 1:
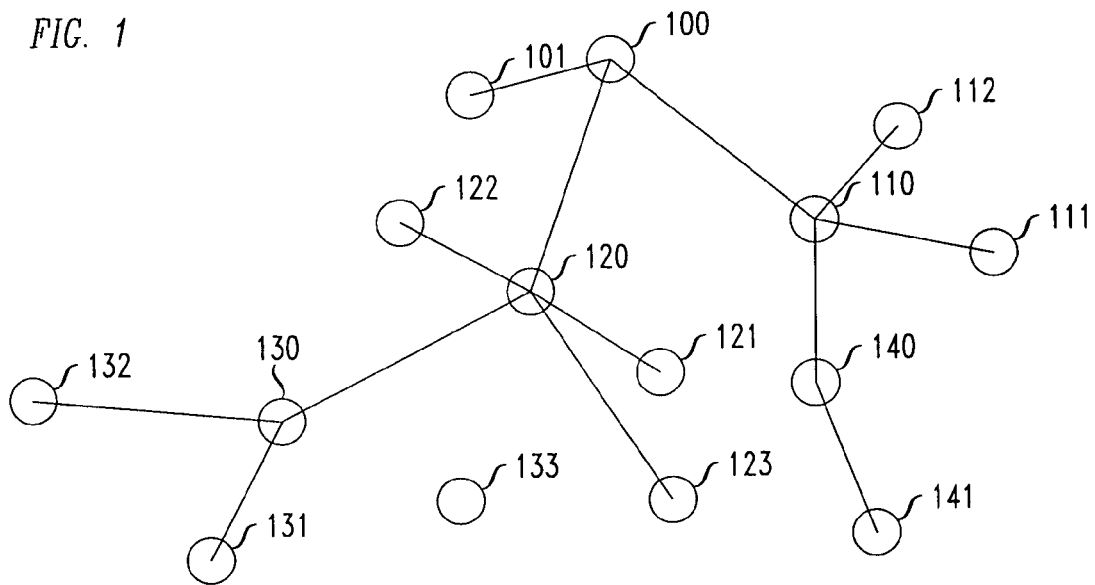
FIG. 1 shows a network created in accord with the principles disclosed herein.

A network in accord with the principles disclosed herein consists of nodes that communicate, for example, via wireless links; and at least some of the nodes may be mobile. It is an ad-hoc network, where individual nodes opportunistically join the network by coupling themselves to nodes of the network that serve as relay nodes. FIG. 1 presents a pictorial view of a network in accord with the principles disclosed herein where, illustratively, node 100 is the root node, nodes 110, 120, 130, and 140 are relay nodes and nodes 101, 111, 112, 121, 122, 123, 131, 132, and 141 are non-relay (leaf) nodes. The root node is the only node in the network that is not ad-hoc, in the sense that the Administrator of the network chooses the root node.

As can be realized from FIG. 1, a leaf node is one that sends out only its own information packets, and accepts only packets that specify it as their target destination. A relay node is one that advertises itself as a relay node by repeatedly broadcasting a heartbeat message and by relaying messages that it receives and which are destined elsewhere.

Two aspects come into play with mobile nodes: their mobility per se, and their power constraints. As for mobility, two nodes that communicate with each other at one time might be not able to communicate at another time, when one of the nodes moves away from the other; this change might consequently cause links of the network to be dropped, leaving segments of the network not connected. Of course, such disruptions must be overcome. In the illustrative embodiment disclosed herein each node includes a Global Positioning System (GPS) module that allows a node to know its location and to also communicate its location to others. The location information is used to help ensure that the network is viably maintained essentially at all times.

Regarding power constraints, it is expected that at least some of the mobile units will be battery-powered and, therefore, they will most likely be limited in terms of transmission power and duration of reliable operation. It is advantageous, therefore, to classify nodes based on their transmission power level. While this classification may be a multi-tier classification, for the illustrative embodiment disclosed herein only two classifications are used: high power and low power.

It is possible to take the view that only nodes that are not power-constrained should be permitted to be relay nodes because (as indicated above) they are more reliably active at all times, and because their coverage is greater than that of power-constrained nodes. In the embodiment disclosed herein, however, any node can be a relay node. In either case an eligible node can choose to become a relay node and can also choose to cease being a relay node, and in either case the root must always be a relay node.

In accord with the principles disclosed herein, every relay node sends out a heartbeat message at some preselected repetition rate; and conversely, it can be thought that every node that sends out a heartbeat message is a relay node (whether it actually relays information packets). The repetition rate is advantageously not the same for all relay nodes. That is, the repetition rates are randomized so as to minimize collisions between transmitted heartbeat messages. In accord with one aspect of this invention, the repetition rate for the power-constrained nodes is chosen to be lower (longer period) than the repetition rate for the non-power-constrained nodes. Messages that collide are treated as if they were not sent.

Each heartbeat message illustratively specifies the following:

| A unique address | for example, an IP address, |
|---|---|
| Its Indirection number | see below, |
| Its location | for example, GPS coordinates, |
| Its transmission power level | for example, a "1" or a "0", |
| Its Confidence number | see below, and |
| Its Doubt measure, D | see below. |

The Indirection number specifies the number of hops that the node believes stand between itself and the root (the root node's Indirection number is, of course, zero). When a node is not "connected," it can be said to have an Indirection number corresponding to a number A that is larger than any expected Indirection number. Once a node is deemed to be "connected" its Indirection number (less than A) specifies the node's level in the network's tree.

The Confidence number is a measurement of how long the node has had a connection to the root through nodes that are confident (by definition the root node is always confident). A node's Confidence number is incremented if, within a timeout period that is greater then the longest repetition rate of any relay node, it hears a heartbeat message from a relay node that it had adopted as the node's uplink node, $n_\uparrow$, and that node is confident. If the node does not hear such a heartbeat message during this timeout, its Confidence number is reset to 0. A confident relay node is a node whose Confidence number is above a preselected number, TH. Optionally, the Confidence number can cease to be incremented when it exceeds TH.

The doubt measure, D, of a node is a measurement of how long it has been since it last had its connection to the root confirmed, and how far it has gone since then. Illustratively, $D_{node} = PD + w \cdot d_{since\_HB} \cdot t_{since\_HB}$, where $t_{since\_HB}$ is elapsed time since hearing a heartbeat message from $n_\uparrow$, $d_{since\_HB}$ is the distance that the node traveled since hearing a heartbeat message from $n_\uparrow$, w is a preselected constant, and PD=0 if $n_\uparrow$ is confident, and PD=0.5D $n_\uparrow$ otherwise.

Figure 2:
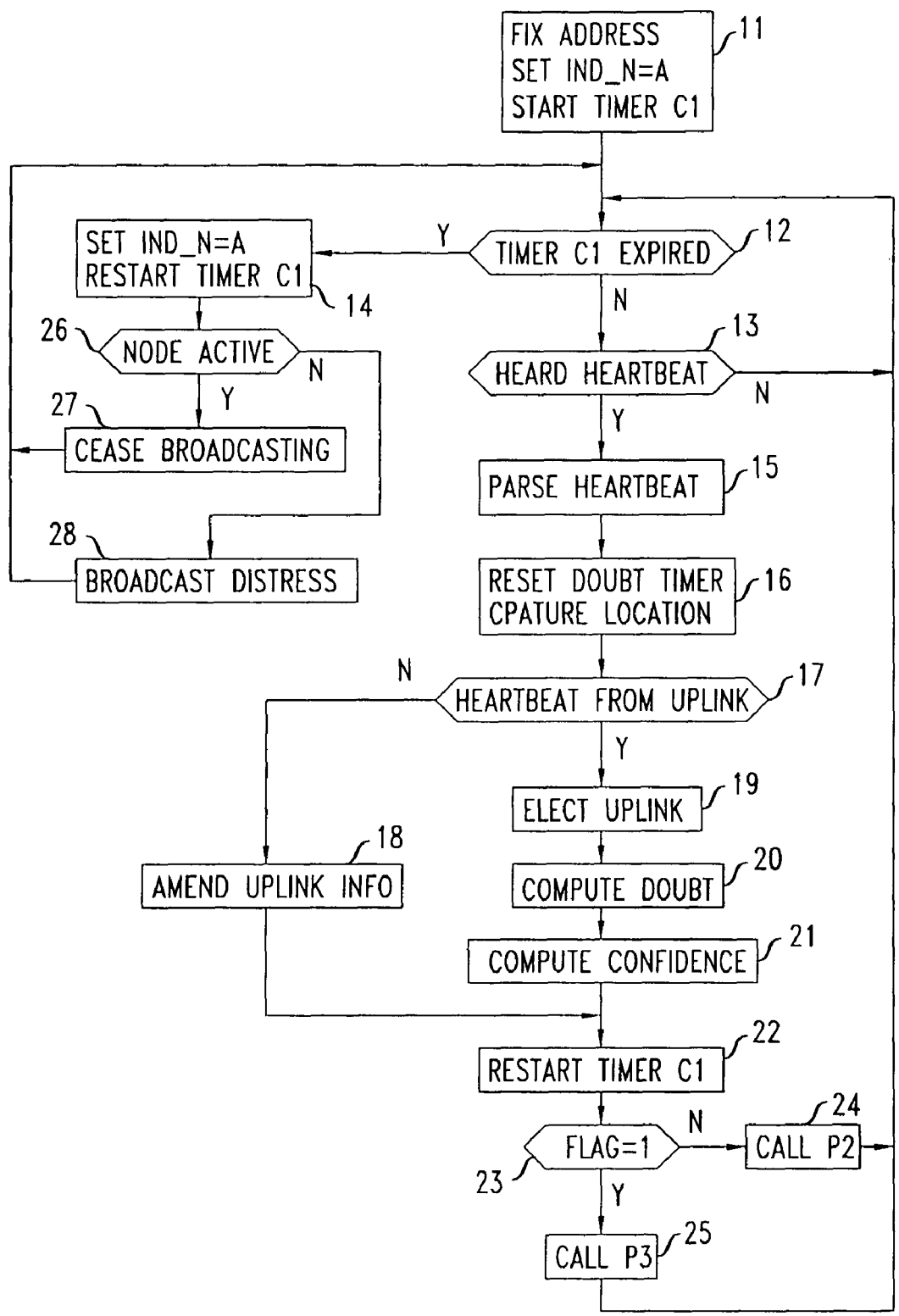
FIG. 2 is a flowchart of process P1 that a node executes in order to be connected to the network.

FIG. 2 is a flow chart of process P1 that is executed by a node, such as node 133, beginning when it first wishes to connect to the network and to thereby become a leaf node.

In step 11 node 133 is given a unique address, for example in the form of an IP address. Since it is not yet connected to the network is it also given an Indirection number A that is larger than any number that is expected to be assigned to a node that is connected to the network. (The number A effectively stands for infinity.) In addition, step 11 starts a timer C1, and passes control to step 12.

Timer C1 is set to provide an interval during which even the slowest relay node in the network is expected to have transmitted a heartbeat message. Consequently, if no heartbeat message is received before timer C1 expires the conclusion is reached that the node ceased receiving heartbeat messages. Control passes from step 12 to step 14, which sets the Indirection number of the node to A, and restarts timer C1.

More particularly, the process reaches step 14 when one of the following situations applies: (a) node 133 has never been connected to the network, (b) node 133 has been connected as a leaf node, but lost connection (e.g., moved too far away from its uplink relay node), or (c) node 133 has been connected and operating as a relay node but also lost connection. Rephrased, step 14 is reached when node 133 nor longer has a viable uplink relay node, $n_\uparrow$, or never had one.

In all instances, step 14 causes the node to begin broadcasting a heartbeat message with an indirection number of A. This, effectively, is a distress broadcast message with two intended results. First, other nodes that also cannot connect to any relay node but hear the distress heartbeat message refrain from sending their own distress heartbeat message and, second, some other leaf node that is connected to the network and that hears the distress heartbeat message will choose to become a relay network (in the manner disclosed below) which, in turn, will cause the node that broadcast the distress heartbeat message to cease being a relay node (in the manner also disclosed below).

Having become a relay node, albeit with indirection number of A, step 14 returns control to step 12.

When step 12 determines that timer C1 has not expired, control passes to step 13. Step 13 listens for heartbeat messages that may be arriving from neighboring relay nodes (that broadcast such messages), and while no message has arrived, control returns to step 12 to determine whether timer C1 has expired. When step 13 determines that a heartbeat message is received, control passes to step 15, which parses the message to cull out the parameters discussed above, and passes control to step 16.

Step 16 resets a Doubt timer (used in calculating Doubt), captures the GPS position of node 133, and passes control to step 17. Step 17 determines whether the node whose heartbeat message was received and parsed, which is the candidate node $n_{candidate}$, happens to be also the current $n_\uparrow$ of node 133. If so, control passes to step 18 which sets the Doubt value of node 133 to 0 if the heartbeat message indicates that $n_{candidate}$ is confident, or to half the Doubt value of $n_{candidate}$, otherwise. Step 18 also changes its Confidence number to Confidence(133)=Confidence(133)+1, if the Confidence number of $n_{candidate}$ is greater than TH, or to 0 otherwise. Control then passes to step 22. Optionally, as before, incrementing of the Confidence number can cease once it exceeds TH.

When step 17 determines that $n_{candidate}$ is other than $n_\uparrow$, control passes to step 19, which considers whether to change the uplink node of node 133 to $n_{candidate}$. Different criteria and sets of rules may be applied to reach the necessary decision. The illustrative rules presented below were found to work quite well:

If IND_N($n_{candidate}$)<IND_N($n_\uparrow$) then $n_\uparrow = n_{candidate}$,
If IND_N($n_{candidate}$)>IND_N($n_\uparrow$) then $n_\uparrow = n_\uparrow$,
If IND_N($n_{candidate}$)=IND_N($n_\uparrow$) the
   If Confidence($n_{candidate}$)>Confidence($n_\uparrow$) then $n_\uparrow = n_{candidate}$,
   If Confidence($n_{candidate}$)<Confidence($n_\uparrow$) then $n_\uparrow = n_\uparrow$,
   If Confidence($n_{candidate}$)=Confidence($n_\uparrow$) then
     If Doubt($n_{candidate}$)<Doubt($n_\uparrow$) then $n_\uparrow = n_{candidate}$,
     If Doubt($n_{candidate}$)>Doubt($n_\uparrow$) then $n_\uparrow = n_\uparrow$, If Doubt($n_{candidate}$)=Doubt($n_\uparrow$) then
    If Power($n_{candidate}$)>Power($n_\uparrow$) then $n_\uparrow$=$n_{candidate}$,
    Else $n_\uparrow$=$n_\uparrow$.
Once a decision is made as to whether to keep the current uplink node, or to replace it with $n_{candidate}$, control passes to step 20 which computes the value of Doubt. From the GPS module that is installed within node 133 (as in all other nodes) step 21 obtains the node's location, and with the help of the GPS information obtained in step 17 it computes $d_{since\ HB}$. The Doubt timer provides the value of $t_{since\ HB}$, and given a weight w (preselected by the designer of the network), the Doubt value of the node is computed as disclosed above. Control then passes to step 21, where the Confidence number is incremented as disclosed above, and then control passes to step 22.

Step 22 restarts timer C1 because either a new relay node was elected, or the existing relay node was re-elected. Control then passes to step 23 which ascertains the value of a Relay flag. When the Relay flag is 0, indicating that node 133 is only a leaf node and not a relay node, control passes to step 24, which is process P2 for determining whether node 133 should become a relay node. When, the Relay flag is 1, indicating that node 133 is a relay node, control passes to step 25, which is process P3 for determining whether node 133 should cease being a relay node. From both, steps 24 and 25, control returns to step 12.

Figure 3:
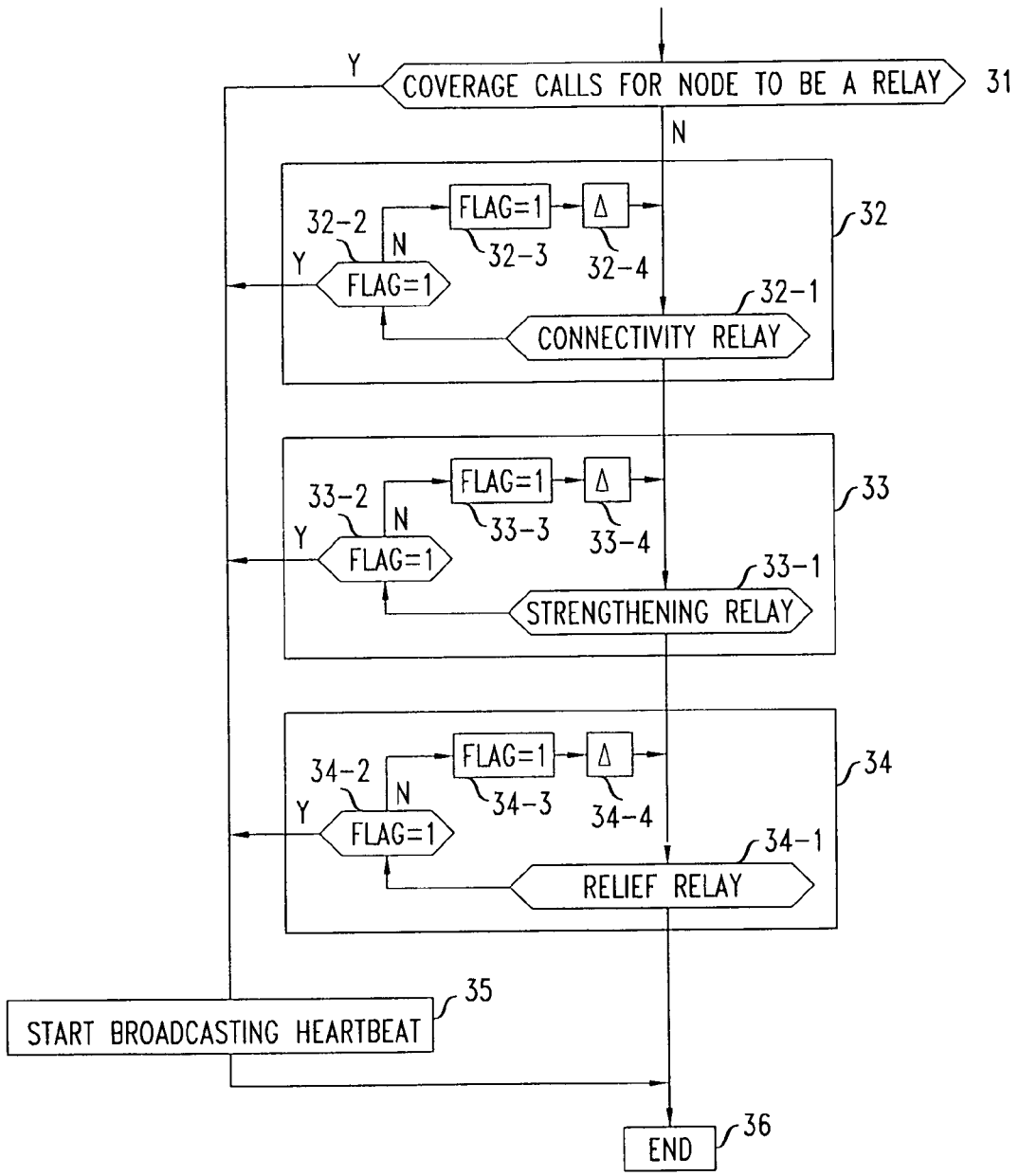
FIG. 3 is a flowchart of process P2 that a node executes in order to determine whether to become a relay node.

As indicated above, in the illustrative embodiment disclosed herein a node decides whether to become a relay node or not. Illustratively, a node makes this decision for any of four reasons: coverage, connectivity, strengthening, and relief. This is depicted in FIG. 3, which discloses an illustrative embodiment of process P2.

Step 31 handles coverage by deciding that a node should become a relay node if all of the heartbeat messages that it hears originate from nodes that are more than some preselected distance, D, away, by passing control to step 37. Otherwise, control passes to step 32. Distance D is a design choice, but it must be smaller than a radius that defines a neighborhood of the node, and that radius corresponds to the distance that the power-constrained nodes can reach. Put in other words, if the node is such that it can hear heartbeat messages from power-constrained relay nodes from a distance D1, then the radius of the neighborhood of the node is D1, and D must be smaller than D1.

Step 32 handles connectivity. Consider a node that is not a relay node but which hears a heartbeat from a relay node with an Indirection number greater than one higher than its Indirection number. For example a non-relay node $n_j$ (for example, now-connected node 133) characterized by an Indirection number 4, might hear a heartbeat from node $n_k$ with an Indirection number 5. Clearly, nodes for which node $n_k$ is an uplink node would benefit by having node $n_j$ be a relay node because their Indirection numbers would drop (from 6 to 5) if they choose $n_j$ as their uplink node. Therefore, it makes sense for node $n_j$ to become a relay node; but to give node $n_k$ an opportunity to select a different node as its relay node and to thereby reduce its own Indirection number (and to reduce churn) node $n_j$ sets a "connectivity" timeout. If the Indirection number of node $n_k$ drops before the "connectivity" timeout expires then nothing is done; otherwise, node $n_j$ chooses to become a relay node. This is accomplished in FIG. 3 by control passing to step 32-1 to determine whether it hears a heartbeat message from a node with an Indirection number higher than its own Indirection number. If so, control passes to step 32-2 which ascertains whether a flag 1 was set to 1. Initially it is not and, therefore control passes to step 32-3 which sets the flag 1 to 1, passes control to delay element 32-4 which imparts the aforementioned "connectivity" timeout, and returns control to step 32-1. If step 32-1 again concludes that it hears a heartbeat message from a node with an Indirection number higher than its own Indirection number, control again passes to step 32-2 which, in turn, passes control to step 35. If step 32-1 does not hear a heartbeat message from a node with an Indirection number higher than its own Indirection number, control passes to step 33.

Step 33 handles strengthening, which pertains to the overall confidence of the network. Consider a node $n_j$ that is not a relay node but which happens to be a confident node that hears a heartbeat from a relay node $n_k$ that is characterized by a confidence of zero. In accord with an aspect of the illustrative embodiment, node $n_j$ sets a "strengthening" timeout. If before the "strengthening" timeout expires node $n_j$ hears a heartbeat from relay node $n_k$ and the confidence level in the heard message is non-zero, then nothing is done; otherwise, node $n_j$ chooses to become a relay node. This is accomplished in FIG. 3 by control passing to step 33-1 to determine whether it hears a heartbeat message from a node with a zero confidence number. If so, control passes to step 33-2 which ascertains whether a flag 2 was set to 1. Initially, it is not and, therefore control passes to step 33-3 which sets the flag 2 to 1, passes control to delay element 33-4 which imparts the aforementioned "strengthening" timeout, and returns control to step 33-1. If step 33-1 again concludes that it hears a heartbeat message from a node with zero confidence, control again passes to step 33-2 which, in turn, passes control to step 35. If step 33-1 does not hear a heartbeat message from a node with zero confidence, control passes to step 34.

Step 34 handles relief, where it is considered whether a low-power relay node might be relieved by a high power node, for it is clearly advantageous to use high power nodes as relay nodes instead of low power nodes. Accordingly, a high-power node that is not a relay node, upon hearing a close heartbeat from a low-power relay, chooses a "relief" timeout. If after that timeout, it still hears a heartbeat from the low power relay node, it chooses to become a relay node. This is accomplished in FIG. 3 by control passing to step 34-1 to determine whether it hears a heartbeat message from a node close low power node. If so, control passes to step 34-2 which ascertains whether a flag 3 was set to 1. Initially it is not and, therefore control passes to step 34-3 which sets the flag 3 to 1, passes control to delay element 34-4 which imparts the aforementioned "relief" timeout, and returns control to step 34-1. If step 34-1 again concludes that it hears a heartbeat message from a close low power node, control again passes to step 34-2 which, in turn, passes control to step 35. If step 34-1 does not hear a heartbeat message from a node with zero confidence, control passes to step 36, where the process terminates.

Step 35 causes the node to set itself up as a relay node, which simply means that the node begins to broadcast a heartbeat message on a regular basis. To do so, the node initiates a clock that controls the repetition rate of the broadcasts and, of course, creates the heartbeat message that is broadcasted. It is noted the aside from the node's address and, most probably, the information about whether the node broadcasts at high power or not, the parameters broadcast by the heartbeat message change from time to time (e.g., the node mobile and its location changes). It is also noted that, in accord with one aspect of this disclosure, high power nodes select a clock period within a range of periods that are longer than the range of periods that power-constrained nodes do. Within their pre-assigned ranges, the nodes select their respective periods randomly (in accord with any of the well known approaches). The periodicity of the heartbeat messages can be the same as the duration of timer C1. When step 35 completes its work, it passes control to step 36.

Any node that becomes a relay node remains a relay node for a preselected minimum period, to avoid churning. That minimum period may be lower for low-power nodes than for high-power nodes. To this end, step 35 includes a churning timeout which, in practice, is simply a decrementing counter that is set in step 35, and is disclosed below, process P3 is held in abeyance until the churning timeout expires.

Figure 4:
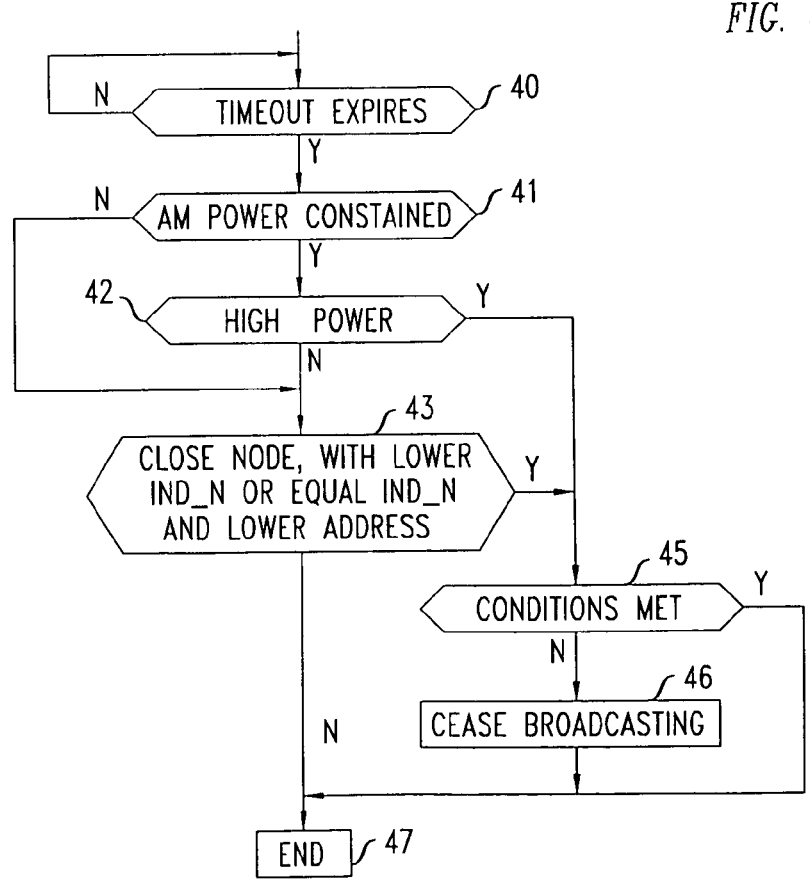
FIG. 4 is a flowchart of process P3 that a node executes in order to determine whether to cease being a relay node.

As it can be surmised from the above, it is sometimes desirable for nodes to cease being relay nodes. Process P3, which executes this task in accord with the principles disclosed herein is shown in FIG. 4, where at the very first step, step 40, the node that executes the process waits till its churning timeout expires, whereupon control passes to step 41 where the node notes whether it is a power-constrained node, or not. If it is, control passes to step 42 where a determination is made as to whether the heard heartbeat message is from a node that is not power-constrained. If so, control passes to step 45. Otherwise, control passes to step 43. Step 43 determines whether either the heard heartbeat message is from a close node with an indirection number that is smaller than the indirection number of the node that is executing the process or from a close node with an indirection number that is equal to the indirection number of the node that is executing the process and a unique address that is numerically lower than that of the node that is executing the process. If not, control passes to step 47. Otherwise, control again passes to step 45.

As disclosed above, a node might become a relay node because of connectivity or strengthening considerations. Step 45 determines whether the node that is executing process P3 became a relay node per force of steps 32 or 33 in process P2, and the node whose heartbeat message is being considered is from a node with a lower Indirection number. If so, control passes to step 47, which ends the process. Otherwise, control passes to step 46 which causes the node to cease broadcasting a heartbeat message.

It may be noted while a node stops being a relay node by simply stopping to send out heartbeat messages (as disclosed above), it continues to relay information packets for at least long enough to handle information packets from downstream nodes that believed the node to be a relay node, as well as information packets that flow downstream from a relay that still believes the node to be on a downstream path from it.

It may also be noted that the above deals with only two power classifications (low and high, or constrained and not constrained, respectively) but when other power levels are possible, process P3 advantageously takes that into account.

To summarize the above, an ad-hoc network is created from a plurality of nodes when one of the nodes is assigned as the root node—by setting its indirection number to 0—and having the root node periodically broadcast a heartbeat message. Those of the plurality of nodes that are within range of the root node will succeed in executing process P1 and become leaf nodes, with an indirection number of 1. Some of the other nodes, being too far removed from the root node to hear the heartbeat message will not be connected to the network. In accord with the disclosed illustrative embodiment, some of the unconnected nodes will nevertheless begin broadcasting a heartbeat message, which is a "distress" message that will cause some of the connected leaf nodes to choose to become relay nodes. In consequence of the newly established relay nodes, the nodes that sent the distress heartbeat messages will connect to the network and cease broadcasting the distress heartbeat messages. The process thus continues and, in due course, all of the nodes become connected to the network.

Communication over the above-disclosed ad-hoc network takes place in a fairly conventional manner, in the sense that packets are sent, each packet contains a source and a destination, and an acknowledgement message is expected by the sender which tells the sender that the message was received, at least by an intermediary node. One approach for providing the "daisy-chain" communication upstream and downstream is to include in each packet an source address of the node that originated the packet, an destination address for the packet, the address of the node that is transmitting the packet (relay address), and a destination address which specifies the node to which the transmission is being made (relay target address). A node accepts all packets with a destination address or a relay target address that is address of the node.

In accord with the principles disclosed herein, additionally and optionally, each node includes a local memory for storing tuples, each of which includes a source address field and a relay address field; i.e., source_address:relay_address.

During operation, an information packet is received by a node either because the node is identified by the packet's destination field or because the node is identified by the packets relay target address. If the former, the packet is simply used by the node. If the latter, the node parses the packet to identify the source address of the packet and the relay address. If a tuple with the identified source address is found in the memory, no updating of the memory is necessary. Otherwise, a tuple is created as illustrated above and stored in the local memory.

Separately from updating the local memory, the received information packet needs to forwarded, and in the current illustrative embodiment, whether the information packet is forwarded upstream or downstream is controlled merely by the relay target address. Accordingly, when an information packet is received and parsed as indicated above, if the destination address of the information packet is found is the source address field of a tuple in the local memory—indicating that the destination of the received packet is downstream from the node—the relay address of the found tuple is placed in the relay target address field of the packet. Otherwise, the node's uplink relay address is placed in the relay target address field of the packet—indicating that the destination of the received packet is upstream toward the root. Lastly, the node's own address is placed in the relay address field of the packet, and the packet is transmitted.

The above discloses the principles of this invention through a presented illustrative example, but various modifications and enhancements are possible without departing from the spirit and scope of this invention. To mention just one, when a node that seeks to be connected to the network cannot hear any heartbeat messages it means that it is too far removed from a relay node, but that does not mean that it is too far removed from a leaf node. According to the embodiment disclosed above, therefore, the node that seeks a connection undertakes to broadcast a heartbeat message, as if it were a relay node, albeit with an indirection number equal to A. Another approach that also achieves the desired result of connecting nodes to the network is for all leaf nodes, randomly, choosing to become a relay node for a short while and see whether some node chooses to connect to the network and send an information packet. If a node does choose a leaf node—temporary relay node as its uplink node, then the node remains as a relay node on a permanent basis. Otherwise it reverts to its leaf node status. To enhance this approach, every node that connects to the network through a selected relay node might, advantageously, be caused to send one information packet to its uplink relay node as a signal that it made said choice.

The invention claimed is:

1. A method for establishing an ad-hoc network comprising a plurality of nodes, where one of the nodes is pre-designated as a root node that constitutes a relay node and said root node periodically broadcasts a heartbeat message which includes an indirection number that indicates the root node being at a first level, said method comprising each non-root node $n_j$ of the plurality of nodes, wherein n represents a non-root node, and j represent an integer value greater than 1, repetitively executing the steps of:
   listening for heartbeat messages, to identify relay nodes of said network that are in neighborhood of said node $n_j$, wherein said heartbeat message further comprises a number representing how long has it been since node $n_j$ had its connection to the root confirmed, and how far it has moved geographically since it had its connection to the root confirmed,
   when node $n_j$ is not yet connected to the network and it hears heartbeat messages,
   selecting a relay node corresponding to one of the heard heartbeat messages as an uplink relay node of said node $n_j$, and
   assigning to itself an indirection number that is one greater than the indirection number found in the heartbeat message of the selected uplink relay node;
   when node $n_j$ is not a relay node and a first preselected condition is met,
   conditioning itself for repetitive broadcasting of a heartbeat message that includes the node's own indirection number, thereby becoming a relay node;
   when node $n_j$ is a relay node, while a second preselected condition is not met, broadcasting a heartbeat message;
   when node $n_j$ is a relay node and said second preselected condition is met,
   conditioning itself to stop broadcasting said heartbeat messages, thereby ceasing to be a relay node.

2. The method of claim 1 where node $n_j$ also repetitively executes the following:
   when it is a relay node with a selected node as its uplink node,
   determining whether another node should be selected as the node's uplink relay node, and if so, changing the selection of its uplink node and its corresponding indirection number, if different, based on indirection number of the newly selected node as its uplink relay node.

3. The method of claim 1 where node $n_j$ also repetitively executes the following:
   when it is connected to said network but it fails to hear a heartbeat message within a preselected time interval,
   setting its own indirection number to a preselected number that is higher than any expected indirection number of a node that is connected to the network.

4. The method of claim 1 where the repetitive execution of said steps is periodic, with period T.

5. The method of claim 4 where the period T is not the same for all of said plurality of nodes.

6. A method for establishing an ad-hoc network comprising a plurality of nodes, where one of the nodes is pre-designated as a root node that constitutes a relay node and said root node periodically broadcasts a heartbeat message which includes an indirection number that indicates the root node being at a first level, said method comprising each non-root node $n_j$ of the plurality of nodes, wherein n represents a non-root node, and j represent an integer value greater than 1, repetitively executing the steps of:
   listening for heartbeat messages, to identify relay nodes of said network that are in neighborhood of said node $n_j$,
   wherein said heartbeat message comprises a number representing how long has it been since node $n_j$ had its connection to the root confirmed, and how far it has moved geographically since it had its connection to the root confirmed,
   when node $n_j$ is not yet connected to the network and it hears heartbeat messages,
   selecting a relay node corresponding to one of the heard heartbeat messages as an uplink relay node of said node $n_j$, and
   assigning to itself an indirection number that is one greater than the indirection number found in the heartbeat message of the selected uplink relay node;
   when node $n_j$ is not a relay node and a first preselected condition is met,
   conditioning itself for repetitive broadcasting of a heartbeat message that includes the node's own indirection number, thereby becoming a relay node;
   when node $n_j$ is a relay node, while a second preselected condition is not met,
   broadcasting a heartbeat message;
   when node $n_j$ is a relay node and said second preselected condition is met,
   conditioning itself to stop broadcasting said heartbeat messages, thereby ceasing to be a relay node.

7. The method of claim 6 where node $n_j$ also repetitively executes the following:
   when it is a relay node with a selected node as its uplink node,
   determining whether another node should be selected as the node's uplink relay node, and if so, changing the selection of its uplink node and its corresponding indirection number, if different, based on indirection number of the newly selected node as its uplink relay node.

8. The method of claim 6 where node $n_j$ also repetitively executes the following:
   when it is connected to said network but it fails to hear a heartbeat message within a preselected time interval,
   setting its own indirection number to a preselected number that is higher than any expected indirection number of a node that is connected to the network.

9. The method of claim 6 where the repetitive execution of said steps is periodic, with period T.

10. The method of claim 6 where said heartbeat message of node $n_j$ contains no information about other nodes.

11. The method of claim 6 where said heartbeat message of node $n_j$ comprises an address of node $n_j$ and an indirection number that was assigned to node $n_j$.

12. The method of claim 6 where said heartbeat message further comprises information about geographical position of said node $n_j$.

13. The method of claim 12 where said geographical position is obtained by node $n_j$ from a GPS receiver that is included in said node $n_j$.

14. The method of claim 6 where said heartbeat message further comprises a number representing how long node $n_j$ has had a connection to the root.

15. The method of claim 6 further comprising the steps of:
   generating an information packet that includes a source address corresponding to address of node $n_j$ and a destination address of some other node in said network; and
   transmitting the generated information packet to the uplink relay node of said node $n_j$.

16. The method of claim 6 further comprising the steps of:
   generating an information packet that includes a source address corresponding to address of node $n_j$, a destination address of some other node in said network, and a relay target address that is the address of the uplink relay node of node $n_j$; and transmitting the information packet.

17. The method of claim 6 further comprising the steps of:

generating an information packet that includes a source address corresponding to address of node $n_j$, a destination address of some other node in said network, and a relay target address field;

consulting a data array within node $n_j$ which contains information entries, where each information entry comprises a source addresses and a relay address;

when the destination address of the generated information packet is found as a source address in an entry of said data array, populating the relay target address field of the generated information packet with the relay address that is associated with the found source address, wherein the relay address is other than the uplink relay node of node $n_j$, when the destination address of the generated information packet is not found as a source address in an entry of said data array, populating said relay target address field of the generated information packet with the address of the uplink relay node of node $n_j$; and transmitting the information packet.

18. The method of claim 17 further comprising the step of, when the destination address of the generated information packet is not found as a source address in an entry of said data array, creating a tuple comprising the source address and the relay address of the received information packet and storing the tuple in said data array.

19. The method of claim 6 further comprising the steps of:

receiving an information packet that includes a source address, an destination address of a node other than $n_j$, an relay address and a relay target destination address that is the address of node $n_j$;

consulting a data array within node which contains information entries, where each information entry comprises a source addresses and a relay address;

replacing the relay address field of the received information packet with the address of node $n_j$; and when the destination address of the received information packet is found as a source address in an entry of said data array, populating the relay target address field of the generated information packet with the relay address that is associated with the found source address, wherein the relay address is other than the uplink relay node of node $n_j$, when the destination address of the generated information packet is not found as a source address in an entry of said data array, populating said relay target address field of the generated information packet with the address of the uplink relay node of node $n_j$; and transmitting the information packet.

20. The method of claim 19 further comprising the step of, when the destination address of the generated information packet is not found as a source address in an entry of said data array, creating a tuple comprising the source address and the relay address of the received information packet and storing the tuple in said data array.

21. The method of claim 6 where node $n_j$ is constructed to broadcast at one a number of set power levels, and said heartbeat message further comprises an indication of the broadcast power level of said node $n_j$.

* * * * *